United States Patent
Gould et al.

(10) Patent No.: US 7,264,717 B2
(45) Date of Patent: Sep. 4, 2007

(54) LIQUID DISPENSING APPARATUS AND A FILTER ASSEMBLY FOR A LIQUID DISPENSING APPARATUS

(75) Inventors: Mark A. Gould, Gainesville, GA (US); Kenneth Jones, Marietta, GA (US)

(73) Assignee: Nordson Corporation, Westlake, OH (US)

( * ) Notice: Subject to any disclaimer, the term of this patent is extended or adjusted under 35 U.S.C. 154(b) by 397 days.

(21) Appl. No.: 10/831,016

(22) Filed: Apr. 22, 2004

(65) Prior Publication Data

US 2005/0236316 A1  Oct. 27, 2005

(51) Int. Cl.
*B01D 35/02* (2006.01)
*B01D 27/08* (2006.01)

(52) U.S. Cl. ............... 210/232; 210/440; 210/450; 222/146.2; 222/330; 222/504

(58) Field of Classification Search ............... 210/232, 210/440, 450; 222/330, 504, 146.2
See application file for complete search history.

(56) References Cited

U.S. PATENT DOCUMENTS

| | | | |
|---|---|---|---|
| 5,413,712 A * | 5/1995 | Gewiss et al. ............... 210/450 |
| 6,251,273 B1 * | 6/2001 | Jawurek et al. ............... 210/232 |
| 6,406,625 B1 | 6/2002 | Brock et al. ............... 210/232 |
| 6,488,845 B1 * | 12/2002 | Neufeld et al. ............... 210/232 |
| 6,896,803 B2 * | 5/2005 | Cline et al. ............... 210/248 |
| 2003/0080155 A1 | 5/2003 | Jeter ............... 222/146.5 |
| 2003/0192292 A1 | 10/2003 | Seedorf ............... 55/493 |

* cited by examiner

*Primary Examiner*—Thomas M. Lithgow
(74) *Attorney, Agent, or Firm*—Wood, Herron & Evans, L.L.P.

(57) ABSTRACT

A spring-biased filter assembly for a liquid dispenser is disclosed that permits ready removal of a filter assembly from a filter housing. The filter housing includes a liquid inlet, a liquid outlet, and a liquid passageway therebetween. The filter housing also has an opening in communication with the liquid passageway. The filter assembly comprises a closure element positioned in the opening and releasably coupled to the filter housing through movement between connected and disconnected positions with respect to the filter housing. A filter element is positioned in the liquid passageway and coupled to the closure element. A biasing member is coupled to the closure element and the filter element and biases the closure element into the connected position.

14 Claims, 4 Drawing Sheets

LIQUID DISPENSING APPARATUS AND A FILTER ASSEMBLY FOR A LIQUID DISPENSING APPARATUS

FIELD OF THE INVENTION

The present invention generally relates to filter assemblies and, more specifically, to filter assemblies used in viscous liquid dispensing systems.

BACKGROUND OF THE INVENTION

Viscous liquids are applied by dispensers onto a surface of a substrate in a variety of dispensing applications employed in the manufacture of products and product packaging. These viscous liquids include thermoplastic materials such as hot melt adhesives. Liquid dispensers utilize pneumatically or electrically actuated valve assemblies for metering a precise quantity of the viscous liquid and discharging the metered amount through a small-diameter dispensing orifice. Many thermoplastic materials exist in a solid form at room or ambient temperature and must be heated to create a flowable viscous liquid. Typically, the solid form of material is placed in a holding tank having heated walls and is melted by heating the solid material above its melting point. The viscous liquid is pumped in a molten state under pressure from the holding tank through a supply conduit to a manifold block. The manifold block has liquid passageways connected in fluid communication with the dispensing orifice of one or more liquid dispensers.

Under certain operating conditions, particles can accumulate in the viscous liquid and cause the liquid dispenser to periodically become clogged or fail. For example, to meet the demand of certain high-capacity dispensing operations, the holding tank must store a substantial volume of the viscous liquid and maintain the stored volume within a desired range of operating temperatures. This prolonged exposure to heat in an oxygen-containing environment may cause at least a portion of the viscous liquid to char, oxidize, or otherwise degrade. These conditions produce solidified, insoluble particles that admix with and contaminate the liquid.

The viscous liquid may also be contaminated by particles generated by the manufacturing operations associated with the liquid dispensing operation. If the holding tank is open to the surrounding environment or if a sealed holding tank is opened to add solid thermoplastic material, airborne particles or fibers can fall into the exposed liquid in the tank. Foreign debris that does not dissolve in the liquid will be pumped to the liquid dispenser.

Continuous operation of the liquid dispenser is contingent upon maintaining an unobstructed fluid pathway for the viscous liquid. Particulate contamination in the supply of viscous liquid can disrupt the operation of the liquid dispenser. The dispensing orifice of the liquid dispenser usually defines the maximum tolerable particle size. Particles that lodge in the dispensing orifice can either totally or partially occlude the flow of viscous liquid to the substrate. Particles may also become trapped between the valve and valve seat of the valve assembly and disrupt the metering of precise amounts of viscous liquid. To ensure that the flow of viscous liquid to the liquid dispenser is uninterrupted and that the desired amount of liquid is administered to the substrate, the liquid passageway of the manifold block typically incorporates a filter element. Viscous liquid flowing through the liquid passageway is directed through the filter element, which has a porosity calculated to remove at least the particles of the maximum tolerable size or larger.

When the filter element becomes clogged, the dispensing operation is interrupted to remove the filter element from the manifold block for cleaning or replacement. The downtime of the adhesive dispensing operation associated with the removal, replacement, repair, cleaning, and reinstallation of the filter element results in lost productivity. If the filter element is difficult to remove or reinstall, the servicing downtime further reduces productivity. Both result in additional downtime and lost productivity. Perhaps the most significant impact of a time delay in servicing the filter element is that the viscous liquid in the holding tank remains static and exposed to an oxidizing atmosphere. This further increases particulate contaminants generated by the degrading liquid.

If a filter element is difficult to remove from the manifold block, maintenance personnel may be reluctant to replace or clean the filter element. If the filter element is not regularly serviced in anticipation of the progressive clogging, the system operating pressure will gradually increase. Eventually, the increase in operating pressure may damage either the liquid dispenser or other sensitive components of the dispensing system.

Thus, an improved filter assembly for a liquid dispenser is needed having a configuration that readily permits rapid removal and reinstallation of the filter element from the manifold block.

SUMMARY OF THE INVENTION

The present invention provides a filter assembly for a viscous liquid dispensing system that overcomes the drawbacks of previous systems as described above. The invention is particularly directed to overcoming problems associated with the attachment and removal of the filter assembly from a filter housing containing the filter assembly. According to the invention, a filter assembly for filtering a liquid includes a closure element having a first connecting member and a filter element having a second connecting member. The first and second connecting members engage each other to couple the closure element and the filter element. Moreover, the closure element is moveable between at least first and second positions relative to the filter element. A biasing member is positioned generally between the closure element and the filter element and applies a biasing force to move the closure element between the first and second positions relative to the filter element.

In an exemplary embodiment of the invention, the first connecting member comprises a retaining slot and the second connecting member comprises a tab. The tab engages the retaining slot to movably couple the closure element to the filter element. The first and second connecting members may advantageously be configured to releasably couple the closure element and the filter element. In this way, the filter element may be quickly and conveniently uncoupled from the closure element and replaced with a new or rebuilt filter element. To this end, the retaining slot has a U-shaped configuration with an open end for receiving the tab. In the exemplary embodiment of the invention, the closure element, filter element and biasing member are axially aligned along a generally longitudinal axis. The U-shaped slots have first and second axial legs connected by a third transverse leg. The closure element is moveable in the axial direction when the tab engages the first and second legs and moveable in the transverse direction when the tab engages the third leg.

The filter assembly, as described herein, may be inserted into a filter housing, such as a manifold, of a liquid dispensing system. The filter housing includes a liquid inlet, a liquid outlet and a liquid passageway in communication with the liquid inlet and liquid outlet. The filter housing also has an opening that communicates with the liquid passageway. The filter assembly comprises a closure element positioned in the opening and releasably coupled to the filter housing. The closure element is moveable between connected and disconnected positions with respect to the filter housing. A filter element is positioned in the liquid passageway and coupled to the closure element. A biasing member is coupled to the closure element and the filter element and applies a biasing force to move the closure element into the connected position with respect to the filter housing.

The closure element includes a shoulder having first and second edge portions spaced from the longitudinal axis. The first edge portion is spaced from the longitudinal axis by a first distance and the second edge portion is spaced from the longitudinal axis by a second distance greater than the first distance. Moreover, the filter housing includes a lip adjacent the opening. When the closure element is in the connected position, the second edge portion of the shoulder confronts and engages the lip thereby connecting the filter assembly to the filter housing. When the closure element is in the disconnected position the first edge portion of the shoulder confronts the lip but does not engage the lip thereby allowing the filter assembly to be removed from the filter housing. The closure element may be moved between the connected and disconnected positions by rotating the closure element, and preferably rotating the closure element approximately 90 degrees.

To limit the movement of the closure element while in the connected position, the shoulder may further include a locking pin extending from the second edge portion. The lip of the filter housing may also include a pin recess. When in the connected position, the locking pin engages the pin recess thereby limiting the movement of the closure element relative to the filter housing. Moreover, to move between the connected and disconnected positions, the closure element is first moved axially along the longitudinal axis toward the filter housing so as to position the locking pin below the lip of the filter housing, and is then rotated relative to the filter housing. In this way, the filter assembly of the invention may be quickly and conveniently removed from the filter housing. The filter assembly of the present invention minimizes the downtime and costs associated with the removal, replacement, repair and/or cleaning of the filter element for optimizing the productivity of the liquid dispensing system.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

According to the invention, a filter assembly for use with a liquid dispensing apparatus permits simplified and convenient insertion and removal from the liquid dispensing apparatus. The spring biasing incorporated into the filter assembly minimizes the downtime associated with the removal, replacement, repair and/or cleaning of the filter assembly and thereby optimizes the productivity of the liquid dispensing operation. It will be appreciated that the present invention may be applied to various apparatus operable for dispensing liquids.

Figure 1:
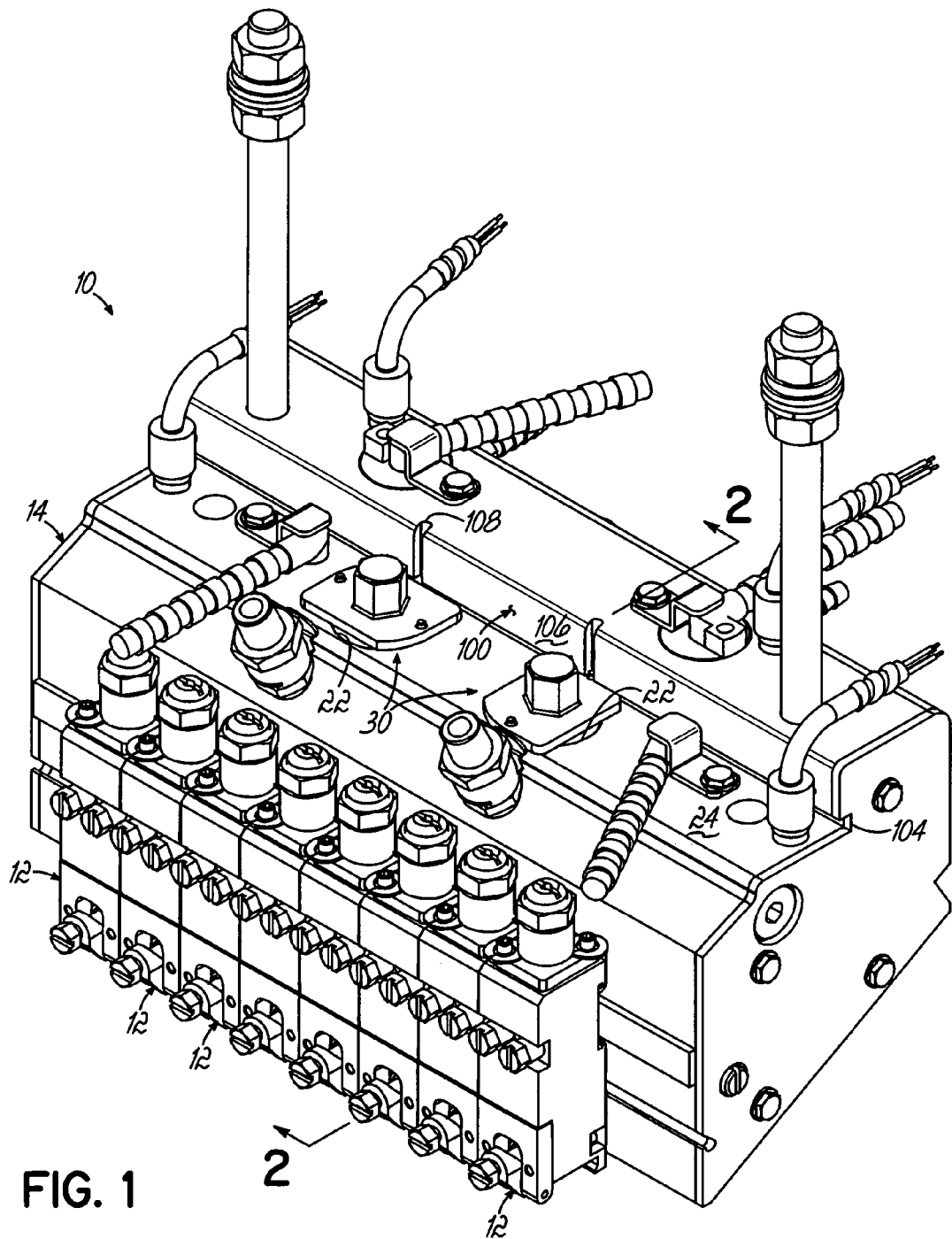
FIG. 1 is a perspective view of a liquid dispensing apparatus incorporating a spring-biased filter assembly.

Referring to FIG. 1, a liquid dispensing apparatus is indicated generally by reference numeral 10. Typically, the liquid dispensing apparatus 10 comprises a plurality of dispensing modules 12 removably attached to a filter housing 14. The dispensing modules 12 receive filtered liquid from the filter housing and in turn dispense or apply the filtered liquid onto a substrate. The dispensing module 12 includes an internal valve assembly (not shown) that may be pneumatically or electrically actuated to dispense controlled quantities of liquid.

Figure 2:
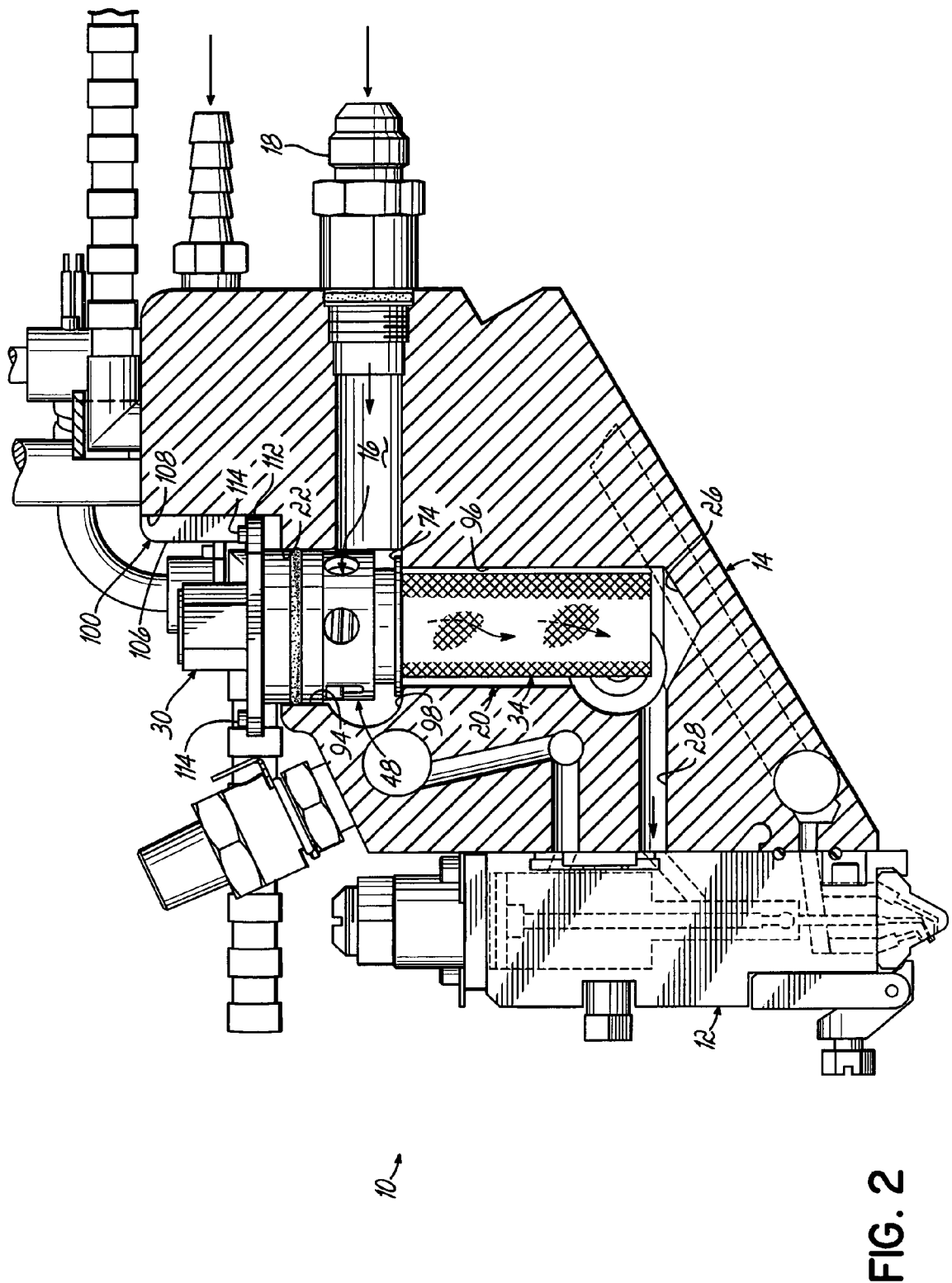
FIG. 2 is a cross-sectional view of the liquid dispensing apparatus of FIG. 1 taken along line 2-2.

With reference to FIG. 2, the filter housing 14 has a liquid supply inlet 16 coupled for fluid communication to a supply conduit 18. Supply conduit 18 provides a flow of liquid to dispensing modules 12 from a remote liquid supply source (not shown), such as a heated holding tank. Liquid inlet 16 is connected for fluid communication with a liquid passageway 20. Passageway 20 has an opening 22 in an outside surface 24 (FIG. 1) of filter housing 14 and an opposed closed end 26. A liquid outlet 28 is provided adjacent the closed end 26. Liquid outlet 28 supplies filtered liquid from passageway 20 to the dispensing modules 12. The liquid passageway 20 has a filter assembly 30 inserted therein for removing particles from the liquid flowing from the liquid inlet 16 to the liquid outlet 28 through liquid passageway 20. Arrows generally trace the flow path of the liquid from the supply conduit 18 through the filter assembly 30 and to the dispensing modules 12.

Figure 3A:
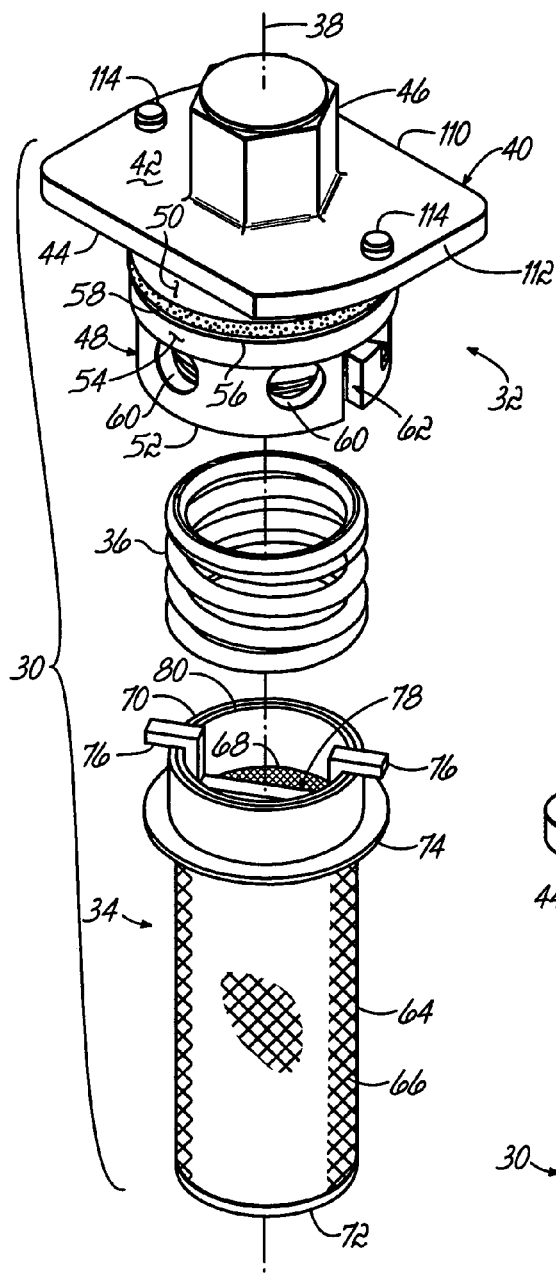
FIG. 3A is a perspective view of a disassembled spring-biased filter assembly according to the invention.
Figure 3B:
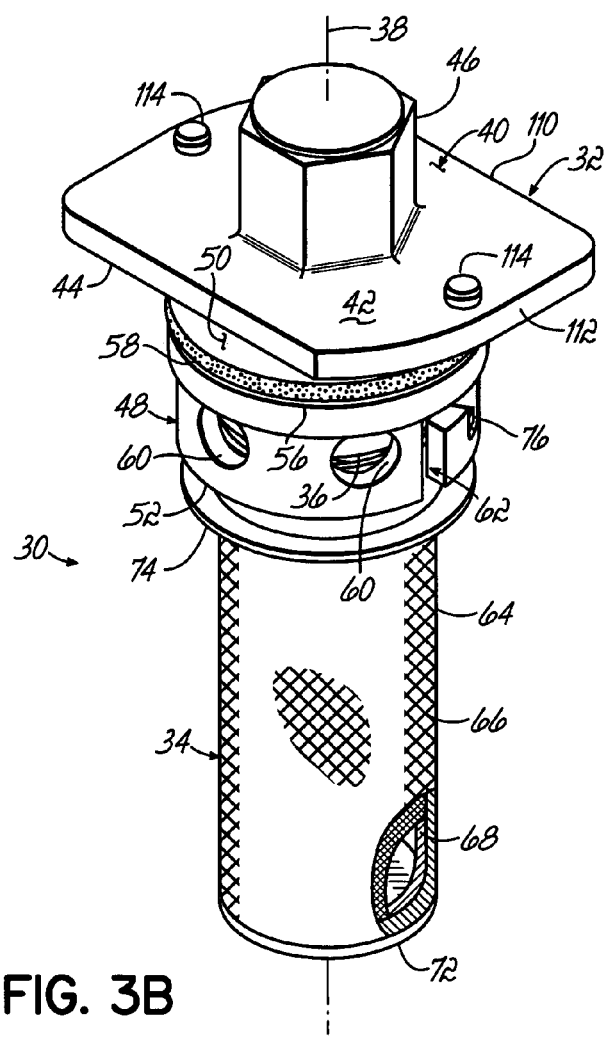
FIG. 3B is a perspective view of an assembled spring-biased filter assembly according to the invention.

Now referring to FIGS. 3A and 3B, an exemplary embodiment of a filter assembly 30 according to the invention is shown. Filter assembly 30 has a closure element 32, a filter element 34 and a biasing member 36 axially aligned along a generally central longitudinal axis 38. Closure element 32 includes a generally rectangular shoulder 40 having a top surface 42 and a bottom surface 44. The top surface 42 includes a hexagonal head 46 coupled thereto and centered about the longitudinal axis 38 for engaging a tool (not shown). The bottom surface 44 includes a ring member 48 having proximal and distal portions 50, 52 respectively, and coupled to shoulder 40 at the proximal portion 50 and centered about the longitudinal axis 38. The outer surface 54 of the ring member 48 contains a groove 56 adjacent the proximal end 50. A sealing member 58, such as an O-ring sits in groove 56 and is adapted to engage the liquid passageway 20 to seal the liquid passageway 20 from the external environment. The ring member 48 contains a plurality of apertures 60 that are in fluid communication with liquid inlet 16 for allowing fluid to flow to the interior of the filter element 34. The ring member 48 further includes a first connecting member. As shown in FIGS. 3A and 3B, the first connecting member may be a retaining slot 62, and preferably a pair of opposed retaining slots. As described below, retaining slots 62 cooperate with the filter element 34 to couple the closure element 32 and filter element 34.

The filter element 34 is a unitary element having a generally cylindrical filter 64. Filter 64 includes an outer support structure 66 and an inner fine mesh screen 68 to filter or remove particles from the liquid flowing through the filter 64. The filter element 34 further includes a top end cap 70 coupled to the filter 64 at a proximal end and a bottom end cap 72 coupled to the distal end of the filter 64. The top and bottom end caps 70, 72 may be made of suitable material, such as stainless steel, and may be coupled to the filter 64, for example, by welding. The top end cap 70 comprises a generally cylindrical member having an outwardly extending flange 74 along a bottom end thereof. The filter 64 is coupled to the inner surface of the top end cap 70 to expose the top end cap 70 on the outer surface of the filter element. The filter may couple to the bottom end cap 72 either internally or externally (internally shown).

The proximal end of the filter element 34 further includes a second connecting member that cooperates with the first connecting member on the closure element to couple the closure element 32 to the filter element 34. As shown in FIG. 3A, the second connecting member is a tab 76, and preferably a pair of opposed tabs. The tabs 76 may be formed, for example, by coupling a cross member 78 to the mouth 80 of the top end cap 70. The cross member 78 includes ends that extend beyond the mouth 80 of the top end cap 70 to form the pair of opposed tabs 76. The tabs 76 in the filter element 34 engage the retaining slots 62 in the closure element 32 to moveably couple the closure element 32 to the filter element 34. The tab and retaining slot configuration also allows the closure element 32 to be moveable with respect to the filter element 34 between a plurality of positions. It is understood that the invention is not limited to the tab/retaining slot coupling but that many first and second connecting members exist that would allow the closure element 32 and the filter element 34 to be moveably coupled.

The biasing member 36, such as a compressive spring, is generally positioned between the closure element 32 and the filter element 34. The biasing member 36 is approximately the same diameter as the top end cap 70 of the filter element 34 and the distal end of the biasing member 36 abuts the top surface of the top end cap 70 and the top surface of the tabs 76. The proximal end of the biasing member 36 fits inside the ring member 48 and contacts the bottom surface 44 of shoulder 40. Biasing member 36 exerts a biasing force that urges the closure element 32 and the filter element 34 in opposite axial directions along longitudinal axis 38.

Figure 4:
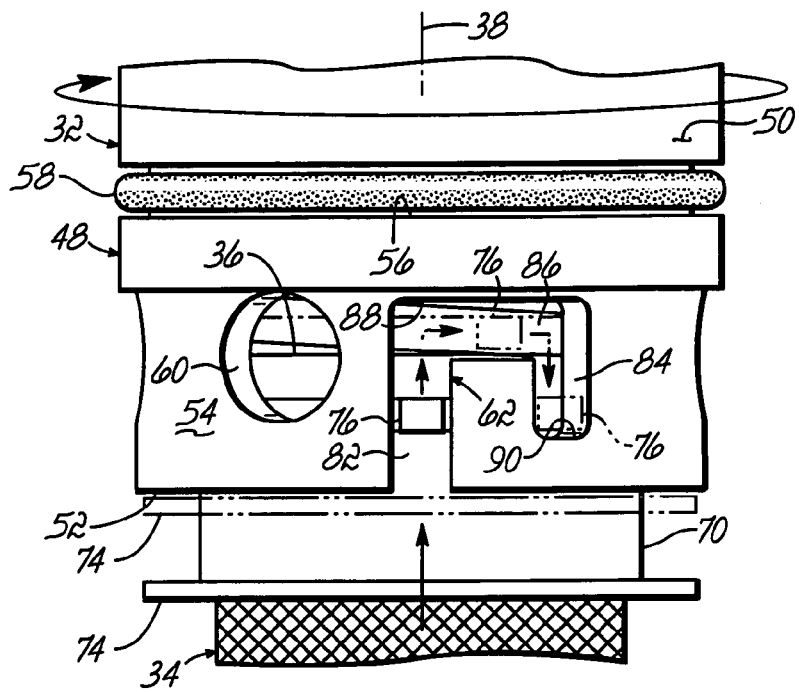
FIG. 4 is a partial side view of the connection between the closure element and the filter element of the filter assembly.

In a preferred embodiment, and as shown in FIG. 4, the closure element 32 and the filter element 34 are releasably coupled. In this way, the filter element 34 may be removed and quickly replaced with a new or rebuilt filter element without the need to replace the closure element 32. To this end, the retaining slots 62 have an inverted U-shape configuration having a first leg 82 and second leg 84 that are axially aligned and a third transverse leg 86 that connects the two axial legs 82, 84. The first leg of retaining slot 62 is open along the distal end 52 of the ring member 48 for receiving the tabs 76 of the filter element 34. When the closure element 32 and filter element 34 are moved together along the axial direction, the tabs 76 engage the first leg 82 of the retaining slots 62. As the closure element 32 and filter element 34 are further moved toward each other, the biasing member 36 is compressed and exerts a biasing force. This axial movement may continue until the tabs 76 engage the top end 88 of the first leg 82. Tabs 76 may traverse the third leg 86 of the retaining slot 62 by moving the closure element 32 in a transverse or circumferential direction relative to the filter element 34 by rotating the closure element 32. The closure element 32 may be rotated until the tabs 76 engage the second leg 84. The biasing member 36 imposes a biasing force to move the closure element 32 away from the filter element 34 in the axial direction. This axial movement may continue until the tab 76 engages the bottom end 90 of the second leg 84. At this point, the closure element 32 and the filter element 34 are moveably coupled together along the second axial leg 84. Advantageously, the closure element and filter element may be quickly uncoupled by reversing the above-described steps. In this way, the filter element may be replaced without replacing the closure element.

The filter assembly 30 may be advantageously incorporated into a liquid dispensing apparatus 10 as shown in FIGS. 1 and 2 for quick removal therefrom. By way of example, the liquid dispensing apparatus 10 may be a hot melt adhesive system where the filter housing 14 is a manifold block. As shown in FIG. 2, the liquid passageway 20 takes the form of a stepped, cylindrical bore comprising an upper chamber 94 having a first diameter and a lower chamber 96 having a second diameter smaller than the first diameter. The upper chamber extends from the entrance of opening 22 to an annular shoulder 98 formed by the convergence of the upper chamber 94 and the lower chamber 96. The filter housing 14 may further comprise a lip 100 adjacent opening 22. For instance, the lip 100 may comprise the upper surface of a groove or slot 104 formed in the base of a sidewall 106 of the filter housing 14 adjacent the opening 22. The lip 100 may further include a recess 108. By way of example, the recess may take the form of a groove formed in the filter housing sidewall 106. As will now be described, the lip/recess configuration cooperates with the filter assembly 30 to releasably couple the filter assembly 30 to the filter housing 14.

Figure 5:
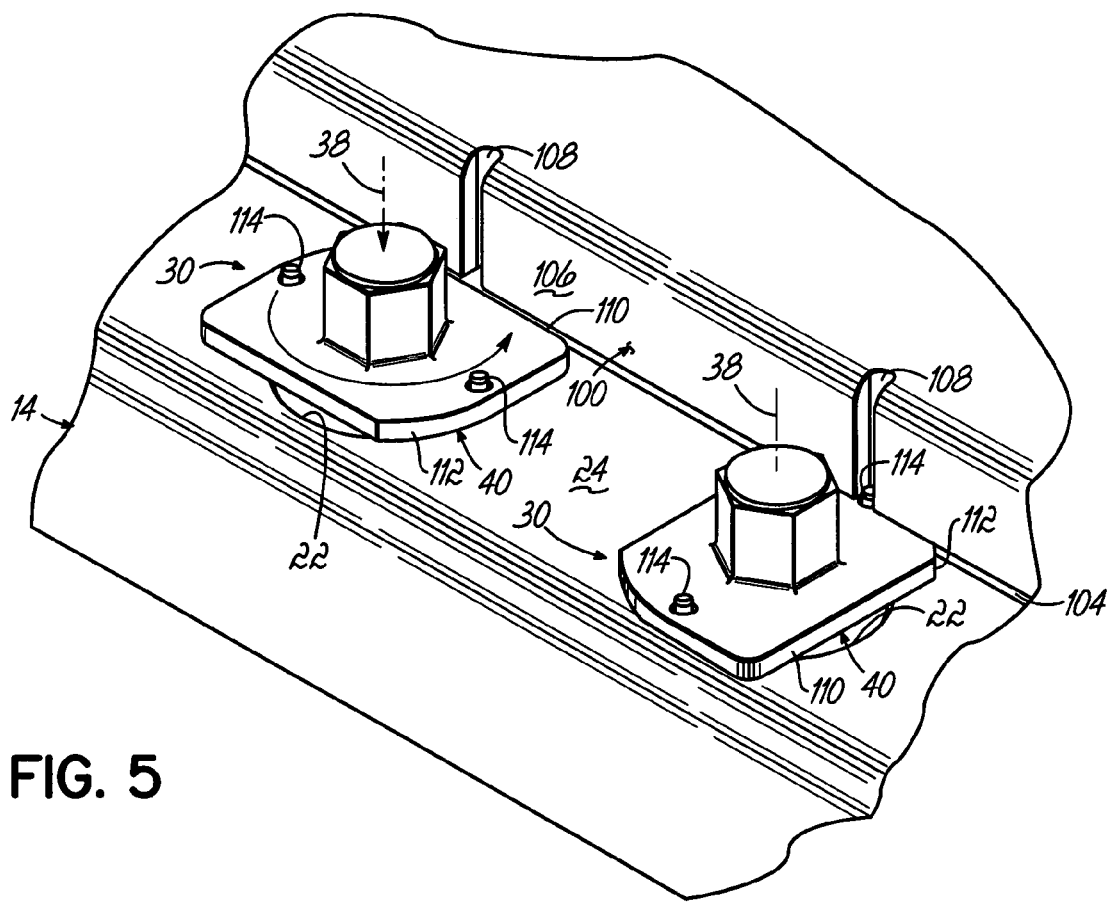
FIG. 5 is a fragmentary perspective of the liquid dispensing apparatus of FIG. 1 showing the connected and disconnected positions of the filter assembly.

As shown in FIG. 3B, the shoulder 40 of the closure element 32 is asymmetric and includes first and second edge portions 110, 112. Generally, the first edge portion 110 is spaced from the longitudinal axis 38 by a first distance and the second edge portion 112 is spaced from the longitudinal axis 38 by a second distance greater than the first distance. Moreover, a locking member may be provided on the closure element. For instance, a locking pin 114 may extend from the top surface 42 of shoulder 40 adjacent the second edge portion 112. As shown in FIG. 5, the filter assembly 30 may only be inserted through opening 22 and into liquid passageway 20 when the first edge portion 110 of closure element 32 is in confronting relation to lip 100 in the filter housing 14. As the filter assembly 30 is inserted, the flange 74 of the top end cap 70 engages annular 98 shoulder in the fluid passageway 20 to prevent any further axial movement of the filter element 34 into the liquid passageway 20 (FIG. 2). At this point, the top surface 42 of shoulder 40 is at least level, and preferably higher than the lip 100 in the filter housing 14. To move the closure element 32 to the connected position, a user moves the closure element 32 in the axial direction toward opening 22 in the filter housing 14. This movement compresses biasing member 36 to create a biasing force urging the closure element 32 away from opening 22 in the filter housing 14. This movement also moves the top surface 42 and locking pin 114 of shoulder 40 below lip 100. While in this position, the user then rotates the closure element 32 about the longitudinal axis 38. Preferably, the closure element is rotated through an angle of approximately 90 degrees so that the second edge portion 112 now confronts the lip 100. The second edge portion 112 is configured to extend beneath the lip 100 and into slot 104. As the closure element 32 is being rotated, the locking pin 114 extending from shoulder 40 aligns with the pin recess 108 in the filter housing 14. The user then releases the compressive force on the biasing member 36 which causes the closure element 32 to move away from the opening 22 so that the top surface 42 of shoulder 40 contacts the lip 100 and the locking pin 114 engages the pin recess 108. In this way, the locking pin 114 and recess 108 prevents rotation of the closure element 32 with respect to the filter housing 14 while the biasing member 36 prevents axial movement of the closure element 32 toward opening 22. The filter assembly 30 is then releasably connected to the filter housing 14.

To disconnect and remove the filter assembly 30 from the filter housing 14, these steps are basically reversed. A user moves the closure element 32 in the axial direction toward opening 22 in the filter housing 14, thereby disengaging the locking pin 114 from the pin recess 108. The user then rotates the closure element 32 so that the first edge portion 110 again confronts the lip 100. First edge portion 110 is free from lip 100 and slot 104 so that the filter assembly 30 may be removed from the filter housing 14.

The spring-biased filter assembly and filter housing, as herein described, provide a number of advantages. First, the quick, simple, and convenient method of connecting and disconnecting the filter assembly from the filter housing decreases machine downtime and optimizes production of the liquid dispensing apparatus. In the invention, there are no threads connecting the filter assembly to the filter housing. Moreover, the releasable nature of the filter assembly allows the closure element to be reused while only replacing the filter element thereby reducing production costs. Second, the spring-biased filter assembly of the present invention prevents undesired removal of the filter assembly from the filter housing. For instance, with a threaded connection between the filter assembly and the filter housing, the filter assembly can be removed while the liquid passageway is under high pressure. The spring-biased connection of the invention prevents removal of the filter when the liquid passageway is under high pressure. In the invention, high pressure in the liquid passageway applies an outward force on the closure element thereby urging the closure element into a more secure connection with the lip of the filter housing. To remove the filter assembly in the invention, a user first compresses the closure element toward the opening to release the locking pin from the pin recess. If the pressure in the liquid passageway is high, a user cannot axially depress the closure element thereby preventing removal of the filter assembly during high pressure conditions. Once the pressure within the passageway has been relieved, a user may then axially depress the closure element and rotate it so as to remove the filter assembly from the filter housing.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A filter assembly for filtering liquids, comprising:
   a closure element having a first connecting member;
   a filter element having a second connecting member, said first connecting member cooperating with said second connecting member to define coupled and uncoupled positions of said closure element and said filter element, said closure element and said filter element requiring relative rotation to move between the coupled and uncoupled positions; and
   a biasing member positioned generally between said closure element and said filter element and biasing said closure element and said filter element away from each other to facilitate the movement between the coupled and uncoupled positions.

2. The filter assembly of claim 1, wherein said first connecting member comprises a first retaining slot, said second connecting member comprises a first tab, said first tab cooperating with said first retaining slot to define the coupled and uncoupled positions of said closure element and said filter element.

3. The filter assembly of claim 2, wherein said first connecting member further comprises a second retaining slot opposite said first retaining slot, said second connecting member further comprises a second tab opposite said first tab, said first and second tabs cooperating with corresponding said first and second retaining slots to define the coupled and uncoupled positions of said closure element and said filter element.

4. The filter assembly of claim 3, wherein each of said first and second retaining slots have a generally U-shaped configuration with an open end for receiving corresponding said first and second tabs.

5. The filter assembly of claim 4, wherein said closure element, said filter element and said biasing member are axially aligned along a generally central longitudinal axis, each of said first and second U-shaped slots having first and second axial legs and a third connecting transverse leg, said closure element moveable in an axial direction when said first and second tabs engage said first and second axial legs, said closure element moveable in a transverse direction when said first and second tabs engage said third transverse leg.

6. The filter assembly of claim 1, wherein said closure element, said filter element and said biasing member are axially aligned along a generally central longitudinal axis, said closure element comprising:
   a shoulder having first and second edge portions spaced from said longitudinal axis, said first edge portion spaced from said longitudinal axis by a first distance, said second edge portion spaced from said longitudinal axis by a second distance greater than said first distance, said shoulder adapted to couple said filter assembly to a filter housing.

7. The filter assembly of claim 6 further comprising:
   a locking member coupled to said shoulder, said locking member adapted to limit movement of said closure element with respect to the filter housing.

8. An apparatus for dispensing a liquid, comprising:
   a manifold block;
   a plurality of dispensing modules coupled to said manifold block for dispensing the liquid; and
   a filter assembly carried by said manifold block, said filter assembly including:
   (i) a closure element having a first connecting member;
   (ii) a filter element having a second connecting member, said first connecting member cooperating with said second connecting member to define coupled and uncoupled positions of said closure element and said filter element, said closure element and said filter element requiring relative rotation to move between the coupled and uncoupled positions; and (iii) a biasing member positioned generally between said closure element and said filter element and biasing said closure element and said filter element away from each other to facilitate the movement between the coupled and uncoupled positions.

9. The apparatus of claim 8, wherein said first connecting member comprises a first retaining slot, said second connecting member comprises a first tab, said first tab cooperating with said first retaining slot to define the coupled and uncoupled positions of said closure element and said filter element.

10. The apparatus of claim 9, wherein said first connecting member further comprises a second retaining slot opposite said first retaining slot, said second connecting member further comprises a second tab opposite said first tab, said first and second tabs cooperating with corresponding said first and second retaining slots to define the coupled and uncoupled positions of said closure element and said filter element.

11. The apparatus of claim 10, wherein each of said first and second retaining slots have a generally U-shaped configuration with an open end for receiving corresponding said first and second tabs.

12. The apparatus of claim 11, wherein said closure element, said filter element and said biasing member are axially aligned along a generally central longitudinal axis, each of said first and second U-shaped slots having first and second axial legs and a third connecting transverse leg, said closure element moveable in an axial direction when said first and second tabs engage said first and second axial legs, said closure element moveable in a transverse direction when said first and second tabs engage said third transverse leg.

13. The apparatus of claim 8, wherein said closure element, said filter element and said biasing member are axially aligned along a generally central longitudinal axis, said closure element comprising:

a shoulder having first and second edge portions spaced from said longitudinal axis, said first edge portion spaced from said longitudinal axis by a first distance, said second edge portion spaced from said longitudinal axis by a second distance greater than said first distance, said shoulder adapted to couple said filter assembly to a filter housing.

14. The filter assembly of claim 13 further comprising:

a locking member coupled to said shoulder, said locking member adapted to limit movement of said closure element with respect to the filter housing.

* * * * *